(12) United States Patent
Bracilovic

(10) Patent No.: US 7,665,418 B2
(45) Date of Patent: Feb. 23, 2010

(54) NON COLOR-TRANSFERABLE ANIMAL LITTER

(75) Inventor: Dragomir Mark Bracilovic, Princeton, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 335 days.

(21) Appl. No.: 11/461,221

(22) Filed: Jul. 31, 2006

(65) Prior Publication Data

US 2008/0022939 A1    Jan. 31, 2008

(51) Int. Cl.
*A01K 1/015*    (2006.01)
(52) U.S. Cl. ..................... 119/173; 119/171
(58) Field of Classification Search ........... 119/171, 119/172, 173
See application file for complete search history.

(56) References Cited

U.S. PATENT DOCUMENTS

| | | | |
|---|---|---|---|
| 3,692,382 A * | 9/1972 | Cloutier | ............ 359/617 |
| 4,206,718 A | 6/1980 | Brewer | |
| 4,471,717 A * | 9/1984 | Lander | ............ 119/171 |
| 4,685,420 A | 8/1987 | Stuart | |
| 4,727,824 A | 3/1988 | Ducharme et al. | |
| 4,883,021 A | 11/1989 | Ducharme et al. | |
| 5,000,115 A | 3/1991 | Hughes | |
| 5,109,804 A | 5/1992 | Chikazawa | |
| RE33,983 E | 7/1992 | Hughes | |
| 5,152,250 A | 10/1992 | Loeb | |
| 5,267,532 A | 12/1993 | Franklin et al. | |
| 5,371,054 A | 12/1994 | Pluta et al. | |
| 5,386,803 A | 2/1995 | Hughes | |
| 5,562,978 A | 10/1996 | Jacobson | |
| 5,638,770 A | 6/1997 | Peleties | |
| 5,735,232 A | 4/1998 | Lang et al. | |
| 5,856,024 A | 1/1999 | Parr | |
| 6,619,233 B1 | 9/2003 | Mochizuki | |
| 6,763,783 B2 | 7/2004 | Mochizuki | |
| 2005/0005870 A1 * | 1/2005 | Fritter et al. | ............ 119/173 |
| 2007/0017453 A1 * | 1/2007 | Fritter et al. | ............ 119/173 |

* cited by examiner

*Primary Examiner*—Rob Swiatek
(74) *Attorney, Agent, or Firm*—Stuart D. Frenkel; Stephen B. Shear

(57) ABSTRACT

A non-color transferable animal litter that employs painted particles and non-painted water absorbent material. The painted particles are colorfast once dry. Upon wetting the dried painted particles do not bleed. The water absorbent material may be a clumping or non-clumping material.

17 Claims, No Drawings

NON COLOR-TRANSFERABLE ANIMAL LITTER

FIELD OF THE INVENTION

The present invention relates to an absorbent composition for animal dross and its method of use. More particularly, the present invention relates to a litter that displays colored speckles without being color transferable.

BACKGROUND OF THE INVENTION

Before the advent of litters, pet owner had relegated pets to outside the home for lack of an area for taking care of pet excrement. Litters allow pets to take care of waste functions and live inside the home. House-broken animals, such as cats, are trained into the habit of urinating and defecating in a specially provided litter box. Similarly, untrained and caged animals, such as guinea pigs, urinate and defecate on the floor of their cage, often in approximately the same floor area of the cage. Consequently, pet owners, homeowners, veterinarians and laboratory personnel have added absorbent materials to the litter box or cage to collect the urine and feces.

The dross-soiled absorbent must be regularly cleaned to maintain a hygienic environment and to thwart the emission of objectionable odors from the presence of the urine and fecal matter in the litter. Removal of fecal matter from any litter is somewhat easy as they are generally solid objects that can be physically removed from the litter. However, physical removal of the feces does not address the issues of removing liquid dross from the litter nor does it help reduce or eliminate odors caused by the urine absorbed into the absorbent. Thus it can be said that the removal of the liquid dross from the litter is harder to execute.

Though the absorbent material aids in absorbing liquid dross, removal of the liquid dross and identification of the liquid dross in the litter is still difficult. Therefore, when the odors caused by the absorbed urine become intolerable, the homeowner discards the litter box absorbent material entirely. Consequently, the litter box absorbent material usually is a relatively inexpensive solid absorbent material, such that an individual cleaning of the litter box is not particularly economically burdensome.

The most commonly used litter box absorbent materials are inexpensive clays, such as calcined clays, that are safe and non-irritating to the animals, and that absorb relatively substantial amounts of liquids. Other porous, solid litter box absorbent materials, that are used alone or in combination, include straw, sawdust, wood chips, wood shavings, porous polymeric beads, shredded paper, sand, bark, cloth, ground corn husks, cellulose, and water-insoluble inorganic salts, such as calcium sulfate. Each of these absorbent materials has the advantage of low cost. For each absorbent material, offensive odors are eventually caused by the absorbed urine, and the entire contents of the litter box, including soiled absorbent material and unsoiled absorbent material, will eventually have to be replaced.

Currently clumping clays and other water absorbent material are used to improve litter compositions. An improved composition for animal litters uses the clayey soils or comminuted rocks, e.g. the sodium bentonites, comprising at least one water-swellable clay mineral in the montmorillonite clay family. These water absorbent materials not only absorb liquid dross, but they aid in the identification of used litter from unused litter portions. These water absorbent materials have the ability to clump and harden after contact with an aqueous liquid such as urine thus facilitating the removal of only the soiled portion of the litter in a litter box or cage during cleaning without the necessity of removing all the litter. The wetted clump has the ability to group into a size substantially larger than the individual particles comprising the litter.

Though these improved compositions have eased the owners' task of removing soiled litter portions, they are still short of addressing problems associated with the burial or splitting of the clumped dross. The buried or split clump, if not timely discovered, will emit offensive odors within a relatively short period of time. Thus when the clumped dross is buried or split the homeowner must still either patiently sift through the litter to remove the used portions or simply discard the partially soiled litter. As a result the benefits of having a clumped litter diminishes since the removal of the clumped dross once again becomes a time-consuming as well as costly process.

The following prior art references illustrate aspects of the technology of animal litter preparation, and, in particular, disclose the use of clays in such litters.

U.S. Pat. No. 4,685,420 issued Aug. 11, 1987 to Stuart, discloses an animal litter composition comprising a water-absorbing polymer such as a polyacrylate combined with a porous inert solid substrate such as clay.

U.S. Pat. No. 5,000,115 issued Mar. 19, 1991 to Hughes, discloses the use of a water swellable bentonite clay as an absorbent litter material. The clay absorbs the liquids in animal waste which on contacting the clay agglomerates it into a stable mass easily separated from the unwetted and unsoiled portion of the composition.

U.S. Pat. No. 5,267,532 issued Dec. 7, 1993 to Franklin, et al., discloses a pH-indicating material maintained on an inert carrier that is separate from the cat litter material. The pH-indicating material has dual indicators that provide one color transition at a low pH and a different color transition at a high pH so that acidic or alkaline animal urine problems can be visibly detected upon contact between the animal urine and the pH-indicating material. The pH-indicating material is water and urine soluble and easily transferable.

U.S. Pat. No. 5,371,054 issued Dec. 6, 1994 to Pluta, et al., discloses an animal litter composition used to diagnose animal health problems. The composition comprises at least one uncalcined clay substrate having a calcium oxide content of less than about 5% by weight and wherein the clay mineral component of said substrate has a attapulgite content of at least about 35% by weight, in combination with at least one chemical pH indicator. All pH indicators are water soluble and easily transferable.

U.S. Pat. No. 6,619,233 issued Sep. 16, 2003 and U.S. Pat. No. 6,763,783 issued Jul. 20, 2004 both to Mochizuki, disclose a granulated-type, urine-discharge processing material for animals that discriminates between before-use and after-use. The material comprises a water absorbent granular body dyed with water soluble dyes or a water absorbent granular body containing powder of water soluble dyes (which will make it color transferable), and a water absorbent surface layer covering a surface of the water absorbent granular body. The water absorbent surface layer and the water absorbent granular body are bonded to each other through a non-continuous water soluble adhesive layer formed of a plurality of adhesive non-coated parts and a plurality of adhesive coated parts which is coated on the surface of the water absorbent granular body. Discharged animal urine is permeated into the water absorbent granular body through the water absorbent surface layer and the non-continuous water soluble adhesive layer, or by dissolving the adhesive coated parts. Thereby, the water soluble dyes are eluted into the discharged urine so that the water absorbent surface layer is dyed through the non-continuous water soluble adhesive layer. The water absorbent granular body is chiefly composed of vegetable fiber or vegetable powder and contains inorganic fillers. The water absorbent granular body further contains powder of a water absorbent polymer so that the granular body can have rich water absorbing and retaining properties. No mention is made to clays in the patent.

Color-indicating litters are the most recent advance in litters, however, use of these litters are still problematic. Despite the common problem of tracking the litter in the home, these color-indicating litters may not only be tracked inside the home, but can discolor home furnishings such as carpets, couches and the like, making a small problem even worse. A need exists for a litter that imparts a color but will not bleed into home furnishings even if tracked by the pet through the home.

SUMMARY OF THE INVENTION

A non-color transferable animal litter is disclosed that contains painted particulate material and non-painted water absorbent material. The absorbent material may be any clumping or non-clumping material known in the art. Once painted, the particles are colorfast and do not interfere with the function of the non-painted water absorbent materials. The painted particles are colorfast, non-water soluble and impart a speckled appearance to the litter.

DETAILED DESCRIPTION OF THE INVENTION

The non-color transferable animal litter of the present invention includes non-painted water absorbent material and painted particles. The water absorbent component may be clumping or non-clumping in response to wetness. The water absorbent materials may be naturally clumping clays, e.g. sodium bentonite, non-clumping clays combined with clumping agents, non-clay materials combined with clumping agents, organic based litter combined with clumping agents or even of a clumping clay, such as sodium bentonite, mixed with any of the above materials. The painted particles provide the litter with a speckled appearance. The painted particles in the litter are colorfast and will not bleed once dried. In the rare situation where a cat's paws may transfer a dried, hard, non-sticky, colorfast, colored speckle or portion thereof onto a carpet, couch or similar surface, it may be easily removed by vacuuming.

The commonly used water absorbent materials useful in animal litter are clays. The water-absorbent clayey component of the animal litters of this invention may be, for example, a clayey soil or comminuted rock containing at least one water swellable clay mineral. Such clay mineral may be, for example, a montmorillonoid or smectite, having a three-layer, sheet structure crystal lattice with two layers of silicon/oxygen tetrahedrons between which is a central layer of aluminum and/or magnesium/oxygen dioctahedrons or trioctahedrons. Part of the silicon in the tetrahedral layers may be substituted with aluminum and part of the aluminum and/or magnesium in the central octahedral layer may be substituted with other elements such as lithium, chromium, zinc, or iron. Contemplated montmorillonoid clay minerals are montmorillonite and nontronite containing a dioctahedral central layer, and hectorite, saponite, and sauconite containing a trioctohedral central layer.

When the foregoing montmorillonoid clay minerals are contacted with water or water vapor, the water molecules penetrate between the layers causing interlayer or intracrystalline swelling and expansion of the entire lattice. This causes the particles of clayey component in the animal litter to agglomerate thus facilitating the removal of only that portion of the litter which is swelled by urine or other aqueous waste liquid.

The often used clayey component of the animal litter of the present invention is a comminuted bentonite, more preferably a sodium bentonite, which contains a preponderant amount of montmorillonite clay mineral. The use of bentonite clays in a variety of applications, such as a component in drilling muds, is well known. Bentonites are economical, readily available clays, with certain forms capable of hydrating and swelling in the presence of water. The swelling properties of bentonite are related to the exchangeable cations present in a particular bentonite ore. The water-swellable bentonite clays contain various exchangeable cations, including sodium, potassium, lithium, ammonium, calcium and magnesium. Although any of these cations can be the predominant exchangeable cation of the bentonite clay of the present invention, bentonite clays often include a variety of exchangeable cations.

The water-swellable bentonite clays useful in the animal dross absorbent compositions of the present invention include any water-swellable bentonite clay that hydrate in the presence of water, erg., swell in the presence of water. The water-soluble bentonite clay can be selected from the group consisting of sodium bentonite, potassium bentonite, lithium bentonite, calcium bentonite and magnesium bentonite; or combination thereof. The bentonite clay can be any member of the dioctahedral or trioctahedral smectite group, or a mixture thereof. Examples include Montmorillonite, Beidellite, Nontronite, Hectorite and Saponite; or combinations thereof.

The animal litter market is dominated by clays. However, the naturally clumping clays are not the only sort of water absorbent material useful in the litter. As mentioned above, other water absorbent material may be used as litter such as non-clumping clays which have been converted to clumping clays with the addition of clumping agents.

These non-clumping clays include Attapulgite, Fuller's earth, calcium bentonite, palygorskite and sepiolite. The Fuller's earth clay, also referred to herein as Fuller's earth or clay, constituent of the compositions of this invention is a natural, earthy material composed primarily of hydrous aluminum silicates, while small amounts of non-clay materials can also be present. Calcium bentonites can range in color from a cream, off-white to a dark reddish tan color and are frequently referred to in the trade under designations such as Mississippi Brown and Mississippi White. These animal litter clays can be divided into heavy weight clays and light weight clays. Fuller's earth and calcium bentonite are heavy weight clays. Sepiolite and attapulgite (palygorskite) are light weight clays.

Other clays useful in the litter may include kaolinite, illite, halloysite, hormite, vermiculite or mixtures thereof.

With the large part of the animal litter market being dominated by clumping and non-clumping clays, the remainder of the market is made up of a variety of non-clay substances. Examples of non-clay materials that can be used in the present invention and are treated with clumping agents include zeolites, crushed stone (like dolomite), light density aggregates and silica gels. Zeolites and silica gels have been known to be used in the context of odor maintenance. It should be noted that clumping clays, such as sodium bentonite, may feasibly be mixed with any of the above materials to form a water absorbent material.

Still other water absorbent materials may be made of suitable organic based litter used herein with the addition of clumping agents. These natural products include, and are not limited to, such materials as wood based materials such as wood chips, wood shavings, wood flour, sawdust; straw; clay; porous beads such as those of polyethylene, polypropylene or polystyrene; paper based materials such as shredded paper; cloth; alfalfa; cotton; sand; bark; ground corn husks; ground sugar cane; lignocellulose; cellulose; calcium silicate; calcium sulfate; various grains (corn, wheat, flax etc.); or cellulosic products such as sawdust, woodchips or plant hulls. See e.g., U.S. Pat. Nos. 4,206,718; 4,727,824; 4,883,021; 5,109,804; 5,152,250 which are incorporated herein by reference.

The clumping agents, or clump enhancing materials, used in connection with the present invention are those known in the art such as clumping clays, polysaccharides, water-soluble gums, dry particulate cellulosic ethers and water-absorbent polymers, among other things. Clumping agents promote adhesion of the fine size particles of litter substrates to each other as well as promoting adhesion of the granules to form an agglomerate when welted. Preferably, the clumping agent allows the formation of a gelled agglomerate when exposed to a liquid, such as animal urine.

Natural occurring polymers for use in connection with the present invention include, for instance, gum arabic, gum karaya, gum tragacanth, gum ghatti, guar gum, alginates, carrageenan, pectins, starches, dextran, xanthan gum, gelatin, gluten, corn starch and dried plants of the Plantago family. An example of a suitable gum-clumping agent is a water-soluble galactomannan gum, such as a guar gum or a locust bean gum, or an ether derivative thereof, that forms a gel upon contact with liquid. Suitable clumping agents of vinyl polymers include polyvinyl alcohol, polyvinyl esters such polyvinyl acetate, polyvinylpyrrolidone, polyvinyloxazolidone, polyvinylmethyloxazolidone, copolymers and mixtures thereof.

Semisynthetic polymers useful as clumping agents in the present invention include cellulose ethers and guar gum derivatives. The cellulose ether can be methyl cellulose, hydroxyethyl cellulose, hydroxypropyl cellulose, ethylhydroxyethyl cellulose, methylhydroxypropyl cellulose, carboxymethyl cellulose, hydroxypropylmethylcellulose or mixtures thereof. A combination of various vinyl, natural and semisynthetic polymers can be used as clumping agents in the present invention.

Useful polymers are preferably capable of absorbing many times their own weight of an aqueous fluid such as urine. The formed agglomerates have sufficient mechanical integrity to be conveyed from a litter box as a discrete entity using methods typically used in removing waste product from a litter box such as with implements or manually by hand.

Other useful clumping agents in the present invention are commercially available, for example, commercially available cellulose ethers such as methylcellulose A4M and hydroxypropylmethylcellulose J15MS, E15LVP, K4M and K15M, are all available from The Dow Chemical Company. Various starches, including Starch 1500, are available from Colorcon, a division of Berwind Pharmaceutical Services, Inc. As another example, guar gum is available from Aqualon Company.

Although the above discussion is focused on clumping cat litters, which have a preferred place in the market, as those skilled in the art will appreciate, the speckles described in the present invention may also be used with non clumping cat litter.

The paint used in producing the painted particles may include paints of any kind and any color. Suitable paints include any type of pigment or dye additive enclosed within a binder vehicle such as oils, or a typical liquid vehicle such as resins. The pigments and dyes disposed in the vehicle are preferably non-water soluble when the paint is dry. One preferred type of paint used is a polymer aqueous-based latex. The particles that are painted herein include sodium chloride and calcium magnesium carbonate, such as crushed dolomite, light density aggregates or any other material of appropriate particle size.

The paint is applied directly to the surface of the particle via methods known in the art. The preparation of the painted particles may be carried out by hand or in any conventional equipment intended for the blending, spraying, brushing or mixing of the paint to the particles. Examples of suitable equipment are air brushers, atomizers, ribbon blenders, V-shell blenders, Marion mixers, and Norda mixers. A preferred equipment is a ribbon blender. The mixing time and rate can start from one minute at 30 RPM, Preferably the total mixing time is 1 minute at 30 RPM.

Generally the amount of paint used in the present invention to obtain desired coverage is about more than 1 wt. % based on the weight of the particle. In the broadest sense, the paint level can range from about 0.1 wt. % to 10 wt. %, preferably about 0.1 wt. %-5 wt. %, and more preferably about 0.5 wt. %-2 wt. % relative to the particles to which the paint is applied. However, in some cases higher paint levels may be required to obtain desired coverage on the particles. To improve the spreading of paint, e.g. latex, different amounts of water could be used to dilute the paint and reduce the paint viscosity. The maximum amount of water used to dilute the paint can vary from 1-50% or more, depending on whether drying of the painted particles is permissible. Various methods of drying can be used such as blowing hot or cold air over the coated particles. At preferred mixing conditions, no separate drying step is required.

The painted particles are incorporated into the dry litter to give a speckled appearance. The amount of painted particles in the litter can be about 0.1-20 wt % or more of the animal litter. The non-color transferable animal litter may optionally contain a fragrance component. This may be a powdery "fragrance preblend" comprising a pleasant smelling oily liquid or "perfume oil" absorbed on particles of a fragrance carrier having a high surface to volume ratio. The perfume oil may comprise one or more essential or synthetic oils which are well-known in the art as providing a pleasant odor to the composition containing them and also as having the capability of somewhat masking unpleasant odors. The fragrance carrier may be any of a group of siliceous and other materials also well-known in the art as having a high surface to volume ratio and as being able to absorb perfume oils efficiently while maintaining their powdery consistency, e.g., dimorphous silicas or starches.

If a fragrance is utilized, an amount of fragrance in an acceptable range, typically from 0.1-10%, can be employed. The fragrance could be added to the painted particle during the course of painting the particle or after the painted particle is painted and dried. The litter composition may also optionally contain zinc oxide (ZnO) which exerts a bactericidal action on the waste products in the litter. Since at least some of the foul odors of urine and fecal matter over a period of time is caused by the bacterial breakdown of the components of such matter, the anti-bacterial action of the ZnO results in a reduction of the generation of such odors. If sodium chloride is used as the paint carrier for the colored speckles, the bactericidal action on waste product is "built in."

The litter compositions of this invention may be used for a wide variety of animals and birds, e.g., uncaged household pets such as cats and dogs, particularly puppies too young to be walked, caged pets such as hamsters, gerbils and rabbits, caged laboratory animals such as guinea pigs, mice, rats and monkeys, animals raised for fur such as mink, barnyard birds such as chickens, ducks and geese, and pet birds such as parrots, parakeets, canaries and pigeons. The compositions of this invention are particularly suitable for use as cat litters.

The invention is furthered by the following examples.

EXAMPLE 1

Several different paints like tempera, acrylic and latex paints were evaluated to determine the feasibility of sodium chloride painting and the most economical color with good coverage using a laboratory two-liter Hobart blender. The paint was poured onto salt (sodium chloride) at the beginning of the batch. Mild mixing was sufficient to spread the paint over sodium chloride particles. Coverage of the sodium chloride particles with paint was uniform. The speckles were not sticky at the end of the batch and there was no need to dry the batch. Latex paint was found to be the most preferable. The minimal latex paint amount for satisfactory coverage was slightly more than 1%.

EXAMPLE 2

50 lbs. of Benjamin Moore Eggshell Enamel Evening Blue latex paint, about 1.25 wt. %, were added to 3,950 lb of Morton Medium Solar Salt in a 5,000 lb ribbon blender. The paint was added by pouring into a mixer from a 5 gallon pail at both ends of the blender. The paint dispersed and mixed quickly. Mixing was sufficient to spread the paint uniformly over the sodium chloride particles. After one minute the salt was dosed with paint. After ten minutes of mixing at about 30 rpm, latex/salt speckles were free flowing and had a uniform blue color. Minimal buildup was noticed on the blender walls, shaft and ribbon. There was no need to dry the finished speckles.

EXAMPLE 3

The procedure of Example 2 was carried out except that 75 lbs. of paint, about 1.88 wt. % was used. The latex/salt speckles produced were free flowing and had darker blue color in comparison to Example 2. Again, there was no need to dry the finished speckles.

COMPARISON OF EXAMPLES 2 AND 3

Examples 2 and 3 were tested on the production line. No problems were noticed in handling and dosing the batch of latex/salt speckles. Two super sacks, 2,000 lbs. each Example 2 and 3 were stored for caking and lumping evaluation. Only very soft lumps were noticed after a period of five weeks.

What is claimed is:

1. A non-color transferable animal litter comprising
   (a) painted particles selected from the group consisting of sodium chloride and calcium magnesium carbonate, and
   (b) non-painted water absorbent material.
2. The litter of claim 1, wherein the painted particles are particles coated with a polymer latex paint.
3. The litter of claim 2, wherein the amount of paint is about 1 wt. % to 10 wt. % based on the weight of the painted particle.
4. The litter of claim 3, wherein the amount of paint is about 0.1 wt. %-5 wt. % based on the weight of the painted particle.
5. The litter of claim 4, wherein the amount of paint is about 0.5 wt. %-2 wt. % based on the weight of the painted particle.
6. The litter of claim 1, wherein the painted particles are particles coated with an oil based paint.
7. The litter of claim 1, wherein the painted particles are water insoluble when dry.
8. The litter of claim 1, wherein the water absorbent material is non-clumping material.
9. The litter of claim 8, wherein the non-clumping material is selected from attapulgite, Fuller's earth, calcium bentonite, palygorskite and sepiolite.
10. The litter of claim 1, wherein the water absorbent material is a naturally clumping clay.
11. The litter of claim 1, wherein the water absorbent material is sodium bentonite.
12. The litter of claim 1, wherein the water absorbent material is non-clumping clay combined with clumping agents.
13. The litter of claim 1, wherein the water absorbent material is non-clay material combined with clumping agents.
14. The litter of claim 1, wherein the water absorbent material is organic based litter combined with clumping agents or clumping clays.
15. The litter of claim 1, wherein the water absorbent material is non-clay substance treated with clumping agents.
16. The litter of claim 1, further including a fragrance.
17. The litter of claim 1, wherein the amount of painted particles is about 0.1-20 wt % of the animal litter.

* * * * *